Sept. 18, 1945. J. J. BLACK 2,385,253
TRAILER VEHICLE WITH LOAD REGULATED TOW BAR
Filed June 23, 1943 2 Sheets-Sheet 1

INVENTOR.
James J. Black
BY Word, Arey, Herron & Evans
Attorneys

Sept. 18, 1945.    J. J. BLACK    2,385,253
TRAILER VEHICLE WITH LOAD REGULATED TOW BAR
Filed June 23, 1943    2 Sheets-Sheet 2
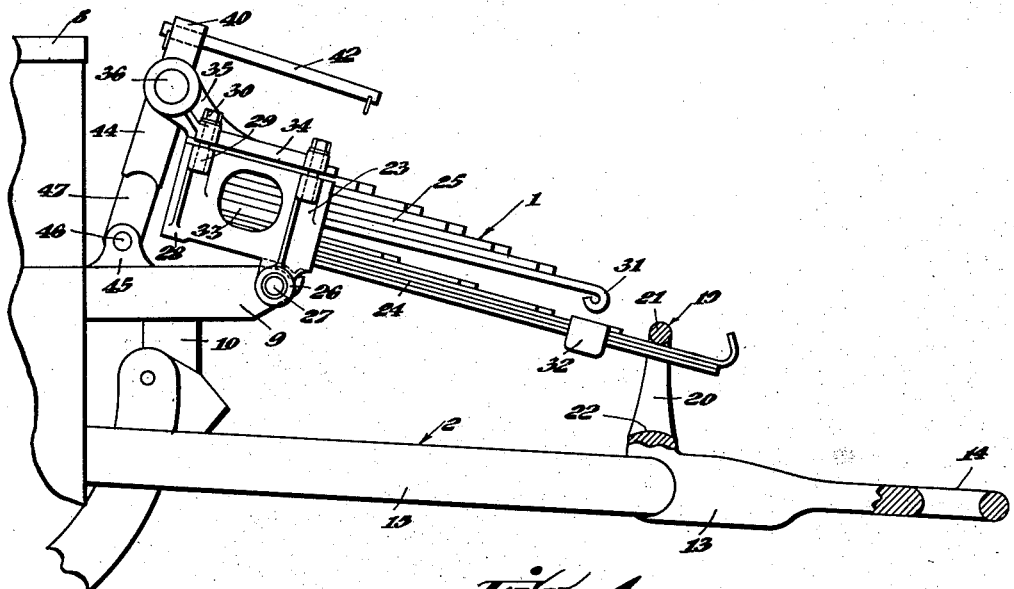
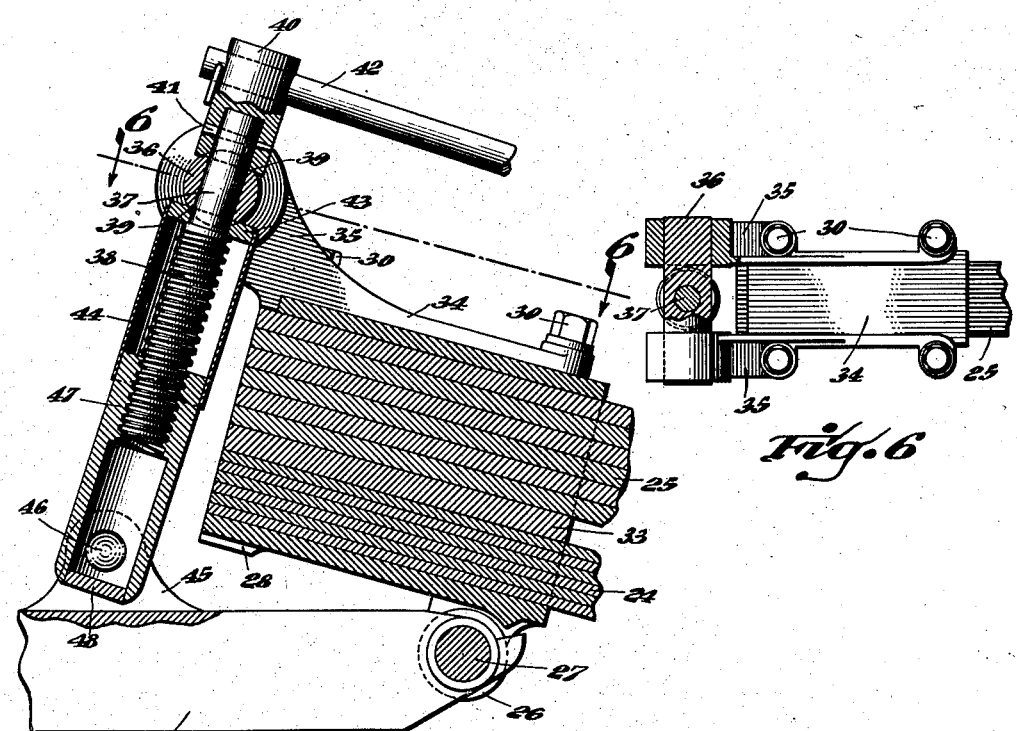
INVENTOR.
James J. Black
BY Wood, Arey, Herron & Evans
Attorneys Patented Sept. 18, 1945

2,385,253

UNITED STATES PATENT OFFICE 2,385,253

TRAILER VEHICLE WITH LOAD REGULATED TOW BAR

James J. Black, Cincinnati, Ohio, assignor to The Trailer Company of America, Cincinnati, Ohio, a corporation of Delaware Application June 23, 1943, Serial No. 491,866

15 Claims. (Cl. 280—33.44)

This invention relates to trailer vehicles which are adapted to be towed either singly or in a train from a tractor. The invention is directed particularly to improvements in the tow bar structure through which the trailer is pulled by the tractor or by a preceding vehicle. The tow bar usually is a shaft or hitch pivotally mounted at the trailer chassis so that its forward end, lying forward of the trailer in a longitudinal direction, may move up or down in unison with movements of the towing vehicle.

The principal purpose of the present invention has been to provide a yieldable and adjustable load regulating apparatus for the tow bar arranged to resist major upward or downward movement of it so that neither the trailer nor the towing vehicle is subjected to undue shocks as the units move along a bumpy or uneven road.

A further objective of the present invention has been to provide a load regulating apparatus of this type which is adjustable so that the front en of the bar may be elevated or lowered conveniently to facilitate the hitching of the trailer to the towing unit and to provide convenient means for adjusting the load regulating pressure on the tow bar when the traler is hitched at different levels from the ground.

A still further object of the present invention has been to provide a simplified tow bar suspension mechanism which is compactly arranged in an out-of-the-way position centrally of the trailer where it least interferes with coupling, loading or parking of the unit. The invention also contemplates an arrangement in which the tow bar is not regulated or restrained against minor movements in an up or down direction in order that it may move freely in conformity with minor undulations in the roadway, while the regulating device comes into play, only as necessary, when major differential movements between the towing vehicle and trailer would otherwise subject either one or both of them to shocks and strain.

Briefly, the preferred embodiment of the present invention comprises a load regulating spring unit which is pivotally mounted on a shelf or suitable platform at the central portion of the front end of the trailer to overhang the tow bar. The front end of the spring unit is positioned for engagement with the tow bar to regulate the movement of it in an upward direction while adjustability is provided for regulating the resisting movement through a screw arrangement cooperating with the platform at the other side of the pivotal mounting of the spring unit. To provide for regulation of the down thrusts of the tow bar it is equipped with a hanger which overlies the front end of the spring to catch upon the spring and thus be resiliently restrained.

In the preferred structure the hanger is spaced from the tow bar so that the distance between the two permits the tow bar to move freely and without regulation to a limited range of movement. The position of this range with respect to the crown is varied through pivotal adjustment of the spring. In the preferred embodiment of the improvement the spring unit consists of an upper and a lower set of leaves. The lower set is disposed intermediate the hanger and the tow bar and functions to restrain the movement of the bar in both the up an down direction while the upper set of springs terminates short of the hanger and acts primarily as a reenforcement resiliently buttressing the lower spring, thereby gradually increasing the load on the trailer when the tow bar tends to move it through a substantial arc in an upward direction only. When the lower spring is adjusted to lie intermediate the hanger and the tow bar, as when the towing vehicle and trailer are hitched together on a level road, the spring is entirely relaxed and wear upon it is thus minimized.

In the drawings:

Figure 4 is a view similar to Figure 3. In this view the spring is shown in the position in which it resists downward travel of the tow bar.

Figure 5 is a fragmentary sectional elevation showing the adjusting mechanism for the spring assembly.

Figure 6 is a fragmentary plan view as taken on the line 6—6 of Figure 5.

Figure 1:
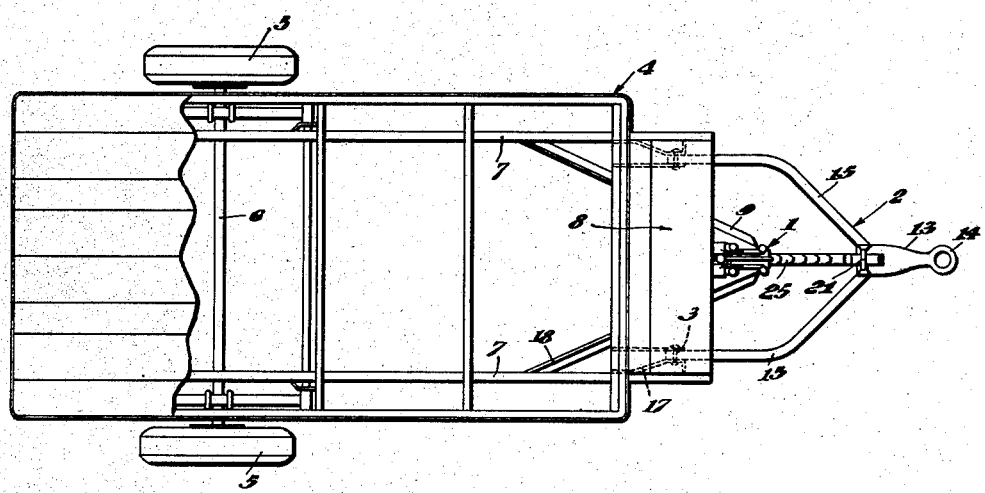
Figure 1 is a plan view of a trailer of the three wheel type equipped with a load regulating tow bar of the present invention.
Figure 2:
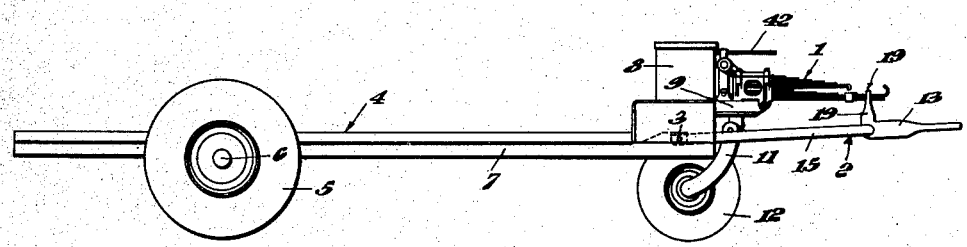
Figure 2 is a side elevation.

In the drawings, the regulating device of the present invention for limiting pivotal movement of a tow bar is indicated generally at 1 and it cooperates with the trailer tow bar 2. This tow bar or hitch is pivotally mounted upon the trailer as at 3.

The trailer shown in the drawings is of the three wheel type comprising a chassis 4 having rear wheels 5, one at each side, mounted on an axle 6 which is carried by the chassis. Rails 7 are spaced inwardly from the sides of the chassis extending longitudinally thereof and projecting beyond the forward end to carry a superstructure which is indicated generally at 8. A shelf or platform 9 extends forwardly from the superstructure to provide a mounting for the regulating apparatus 1. This platform is located centrally of the trailer and a boss 10 is provided at its lower face to rotatably support a fork 11 within which a single front wheel 12 is mounted in the usual manner.

The three wheel trailer shown in the drawings is of a conventional type selected to illustrate the utilization of the present invention and it will be understood that the invention may be employed in conjunction with four-wheeled trailers and other types as desired.

The tow bar 2 comprises a hitch member 13 which has a ring 14 or other suitable device at its forward end to which the tow bar may be hitched to a towing vehicle. Arms 15 extend rearwardly from the hitch member 13 to the trailer chassis at which they are pivotally mounted so that the tow bar as a unit may swing up and down. As shown in Figure 1, for instance, the rear portion of each arm 15 is mounted intermediate plates 16 and 17, the latter being fastened to rail 7 while the former is supported from the superstructure 8. Diagonal braces 18 are provided intermediate the rails 7 and the superstructure for reenforcement. The arms 15 diverge from the hitch member 13 to which they are fastened rigidly, while a hanger 19 extends upwardly from the rear portion of the hitch member for cooperation of the tow bar with the regulating apparatus mounting 1. The hanger consists of vertical side posts 20 interconnected with one another through a cross member 21 which is spaced above the plane of the tow bar. The back portion of the hitch 13 at a point beneath the cross bar 21 has an arcuate bearing surface 22 which constitutes the face of engagement with the regulating spring 1 in upward travel of the tow bar while the underneath surface of the cross rail 21 constitutes the face of engagement during downward travel of the tow bar.

At the forward end of the platform 9, a boxlike spring housing bracket 23 is pivotally mounted to it to contain sets of leaf springs 24 and 25 which are arranged one above the other to extend in a direction longitudinally of the trailer and overlie the tow bar 2. In the preferred structure, the bracket 23 comprises ears 26 which lie along the sides of the platform 9; these ears are bored to receive a rock shaft 27 which passes through the platform to form a pivotal mounting for the bracket. The rear portion of the bracket is provided with a foot 28 arranged to rest against the upper surface of the platform for limiting pivotal movement of the regulating apparatus. The sides of the bracket are provided with lugs 29 threaded to receive clamp screws 30.

Figure 3:
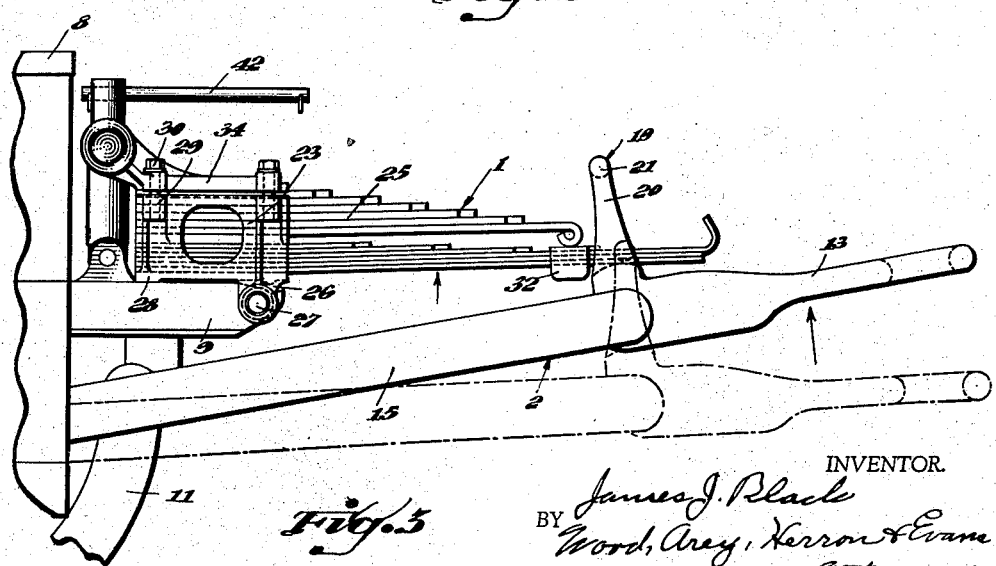
Figure 3 is an enlarged side elevation similar to Figure 2 showing the front end of the unit. In this view the spring is shown in the position in which it is resisting upward travel of the bar.

Each of the sets of springs 24 and 25, as shown in Figure 3, have their rear portions supported in the box bracket 23. The springs are of the cantilever leaf type and at least some of the leaves of the lower set 24 extend forwardly to pass through the opening in the hanger 20. The upper set of springs 25 are also of the cantilever leaf type but terminate short of the hanger, and the outer end of this assembly is provided with a roll 31 which is positioned to engage a shackle 32 embracing leaves of the lower set. The sets of springs 24 and 25 preferably are separated by a spacer 33 and are clamped firmly one against the other underneath a clamp plate 34 which is held on the box bracket through the clamp screws 30. Clamp plate 34 has arms 35 projecting rearwardly from it which, together, form a yoke for supporting a cross shaft 36. This is shown best in Figures 5 and 6. Intermediate the arms 35 the cross shaft is bored transversely to receive a counterturned portion 37 of a screw 38 and, at this point, flats 39 are milled at the opposite sides of the shaft to provide upper and lower seating surfaces. The counterturned portion of the screw passes up through the cross shaft 36 into a collar 40 which is pinned thereto as at 41, while the collar in turn is bored to receive an operating lever 42. A washer 43 rests against the lower flat on the cross shaft 36 and, at its outer periphery, carries a skirt 44. Bosses 45 are provided at the upper surface of the platform 9 to support shaft 46 which pivotally supports the screw nut 47. The nut is an elongated member having its threads cut at the upper end, while the lower end, adjacent shaft 46, is counterbored to provide thread clearance. The lower portion of the nut beneath shaft 46 is plugged as at 48 to keep dirt from the operating mechanism, while the skirt 38 embraces the outer periphery of the nut to enclose the screw.

In the operation of this apparatus, it may be seen that movement of the lever 42 in one direction will rotate screw 38 to raise the cross shaft 36 through abutment of the washer 43 against the lower flat face on the cross shaft and thereby tilt the entire regulating spring assembly 1 to lower its forward end. If the tow bar is suspended from the set of leaves 24 through engagement of the cross rod 21, then the tow bar will be lowered. Conversely, if the screw is rotated in an opposite direction, the lower surface of the collar 37 will abut the upper flat of the cross rod 36 to tilt the entire assembly in an upward direction. Through these movements, the position of the lower set of springs 24 may be adjusted with respect to the plane of the tow bar.

For normal usage of the apparatus with the tow bar hitched to the towing vehicle for travel along a level road, the springs preferably are adjusted so that the spring leaves extending through the hanger lie substantially midway between the arcuate surface 22 and the cross rod 21. If the towing vehicle elevates the tow bar, as when the towing vehicle starts up an inclined surface, before the trailer has reached that point the arcuate surface 22 is lifted against the bottom face of the lower set of leaves. This action causes a resilient lifting pressure to be exerted on the front end of the trailer and a jerking upward movement is avoided. If the incline is steep and the movement continues, the lower set of springs moves upwardly until the shackle 32 engages the roll 30 of the upper set of springs; it then comes into play as a resilient reenforcing to carry a portion of the load. Relative movements of the same type occur if during travel the front wheel of the trailer drops into a chuck hole in the roadway. On the other hand, if the towing vehicle starts to move down a hill or if the front wheel of the trailer hits an obstruction causing a relative lifting movement of the tow bar, then movements take place conversely to those just described with the cross rail 21 coming down to rest upon the upper surface of the spring assembly, whereby the shocks to which it otherwise would be subjected are absorbed. A reenforcing spring unit like the set of springs 25 may, if desirable, be employed to limit downward movements of the set of springs 24 but this usually is not required inasmuch as the front wheel carries the increased loading under such conditions.

It will be understood that shaft type tow bars may be employed in the utilization of the present invention in place of the yoke type shown in the drawings. It will also be understood that the double set of springs, one normally active and the other standing by for reenforcement, may be omitted in preference to a single set though the double set is preferred because of the greater resiliency it normally provides coupled with greater strength to resist heavy loading.

Having described my invention, I claim:

1. A trailer vehicle comprising a frame having wheels thereon, a tow bar pivotally mounted on said frame and extending longitudinally therefrom at one end, a platform on said frame from which the tow bar is extended, a cantilever spring adjustably mounted on said platform and extending longitudinally of the frame in longitudinal alignment with said tow bar, whereby the spring is contacted by the tow bar as it is pivotally swung through an arc in one direction, and means for interconnecting the tow bar and the spring for enabling the spring to yieldably resist movement of the tow bar when it is moved pivotally through a predetermined distance in an opposite direction.

2. A trailer vehicle including a frame having wheels, a tow bar pivotally carried by said frame and extending longitudinally from one end thereof, a platform supported from the frame at a point on the corresponding end of said frame and a load regulating apparatus carried by said platform, including a cantilever spring assembly pivotally mounted thereon and extending longitudinally of said frame to overlie said tow bar and be engageable therewith when the tow bar is moved in an upward direction, whereby further movement thereof is yieldably resisted, means for interconnecting the spring and tow bar to yieldably restrain its downward movements, and means for pivotally adjusting the position of said spring.

3. A trailer vehicle including a frame having wheels, a tow bar pivotally carried by said frame and extending longitudinally from one end thereof, a platform supported from the frame at a point on the corresponding end of said frame and a load regulating apparatus carried by said platform, including a cantilever spring assembly pivotally mounted thereon and extending longitudinally of said frame to overlie said tow bar and be engageable therewith when the tow bar is moved in an upward direction, whereby further movement thereof is yieldably resisted, means for interconnecting the spring and tow bar to yieldably restrain its downward movements, and means including a nut element and a screw element for pivotally adjusting the position of said spring, one of said elements being supported by said platform and the other of said elements being carried by the said load regulating apparatus.

4. A trailer vehicle of the class described, including a frame having wheels thereon, a tow bar pivotally mounted on said frame and extending longitudinally from one end thereof, a platform supported by said frame at a corresponding end thereof and a load regulating apparatus for cooperating with said tow bar to yieldably resist major movements thereof in up and down directions, said load regulating apparatus including a cantilever spring assembly pivotally mounted on said platform and extending longitudinally of said frame above said tow bar and in alignment therewith, whereby the tow bar engages the spring when swung in an upward direction, and means carried by said tow bar to overlie said spring for enabling the spring to yieldably restrain movements of the tow bar as it is swung in a downward direction.

5. A trailer vehicle of the class described, including a frame having wheels thereon, a tow bar pivotally mounted on said frame and extending longitudinally from one end thereof, a platform supported by said frame at a corresponding end thereof and a load regulating apparatus for cooperating with said tow bar to yieldably resist major movements thereof in up and down directions, said load regulating apparatus including a cantilever spring assembly pivotally mounted on said platform and extending longitudinally of said frame above said tow bar and in alignment therewith, whereby the tow bar engages the spring when swung in an upward direction, means carried by said tow bar to overlie said spring for enabling the spring to yieldably restrain movements of the tow bar as it is swung in a downward direction, and means for pivotally adjusting the position of said spring to vary its relation to the tow bar.

6. A trailer vehicle of the class described, including a frame having wheels thereon, a tow bar pivotally mounted on said frame and extending longitudinally from one end thereof, a platform supported by said frame at a corresponding end thereof and a load regulating apparatus for cooperating with said tow bar to yieldably resist major movements thereof in up and down directions, said load regulating apparatus including a cantilever spring assembly pivotally mounted on said platform above the tow bar and having a portion engageable therewith for resisting movement of the tow bar when it is swung in an upward direction, means for pivotally adjusting the said spring assembly to vary the point of engagement of the tow bar with it, and means for interconnecting the tow bar with the spring after the tow bar has been swung through a predetermined arc in a downward direction.

7. In a trailer vehicle having a frame and a tow bar pivotally mounted thereon and extending therefrom in a longitudinal direction, a load regulating apparatus for resisting movements of the tow bar when it is swung in up and down directions thereby to regulate the load upon the trailer, said apparatus including sets of cantilever springs mounted one above the other and extending longitudinally of the trailer in alignment with the tow bar, one of the sets being engageable thereby to resist arcuate tow bar movements while the other set is spaced from the first to carry a part of the load after the other set has been swung by the tow bar through a predetermined distance.

8. In a trailer vehicle having a frame and a tow bar pivotally mounted thereon and extending therefrom in a longitudinal direction, a load regulating apparatus for resisting movements of the tow bar when it is swung in up and down directions thereby to regulate the load upon the trailer, said apparatus including sets of cantilever springs mounted one above the other and extending longitudinally of the trailer in alignment with the tow bar, one of the sets being engageable thereby to resist arcuate tow bar movements while the other set is spaced from the first to carry a part of the load after the other set has been swung by the tow bar through a predetermined distance, said sets of springs being pivotally supported by said frame, and means for pivotally adjusting the sets of springs to vary the point at which they are engaged by said tow bar.

9. In a trailer vehicle having a frame and a tow bar pivotally mounted on said frame and extending longitudinally from one end thereof, a platform supported from said frame, a bracket pivotally mounted on said platform on an axis extending transversely of said frame, a spring assembly carried by said bracket and extending longitudinally of the frame in alignment with the tow bar for engagement thereby when the tow bar is swung through an arc, and means at the opposite side of said pivotal axis for adjusting the angular position of said springs with respect to said tow bar, said means including a nut element pivotally mounted on said platform and a screw element engaging said nut and pivotally and rotatably carried by said bracket.

10. In a trailer vehicle having a frame and a tow bar pivotally mounted on said frame and extending longitudinally therefrom, a platform on said frame, a spring assembly pivotally supported on said platform and having leaves extending longitudinally in alignment with the tow bar for restraining upward and downward movements thereof, and means for adjusting the angular position of said spring assembly with respect to the tow bar to vary the angular positions in which it is restrained, said means including a nut element, a screw element, a skirt extending from the screw element and surrounding the nut element to protect the screw threads against dirt, and means for rotating the screw element, one of said elements being pivotally mounted on the platform and the other of the elements being pivotally and rotatably carried by the spring assembly.

11. In a trailer vehicle having a frame and a tow bar pivotally mounted on the frame and extending longitudinally from one end thereof, a spring assembly pivotally supported by the frame and having spring leaves extending longitudinally therefrom in alignment with the tow bar for restraining movement of the tow bar in up and down directions, a shaft carried transversely of said spring assembly at the end thereof which is on the other side of the pivotal axis from the point of engagement of the spring leaves with the tow bar, a screw rotatably depending from said shaft and means for rotating the screw, a nut pivotally carried by the frame for engagement with the screw whereby rotation of the screw tilts the spring assembly in up and down directions, the said screw having a skirt embracing the outer periphery of the nut for encasing the threads of the screw and nut.

12. A trailer vehicle of the class described comprising a wheeled frame adapted to be connected to a prime mover, a hitch arm hingedly connected to said frame, a resilient, forwardly projecting arm rockably connected to said frame at a point directly adjacent one end thereof with its free end overhanging said hitch arm, an adjusting means associated with the flexible arm, and a contact section on said hitch arm for engagement by the free end of the resilient arm to resist pitching action between the coupled ends of the trailer and the prime mover.

13. A trailer vehicle of the class described comprising a wheeled frame adapted to be connected to a prime mover, a hitch arm hingedly connected to said frame, a resilient arm rockably connected at its one end to said frame with its free end overhanging said hitch arm, and adjusting means mounted on said trailer frame and associated with said resilient arm for adjusting the free end of said resilient arm with relation to the hitch arm.

14. A trailer vehicle of the class described comprising a trailer frame having rear wheels and a castered front wheel; a hitch arm hingedly connected to the frame, a resilient arm rockably mounted on said frame at a point directly adjacent the inner end thereof, the free outer end overhanging said hitch arm, an adjusting means mounted on the frame and connected to the inner end of the said resilient arm to rock it about said rockable connection, a smooth contact surface on the hitch arm for engagement by the free end of the resilient arm, and a handle on said adjusting means to permit adjustment of the free end of the resilient arm with relation to the hitch arm.

15. A trailer vehicle of the class described comprising a wheeled frame adapted to be connected to a prime mover, a hitch arm hingedly connected to said frame, a resilient laminated half spring rockably connected to said frame and having a projecting free end overhanging said hitch arm, an adjusting means associated with said laminated half spring, and a contact section on said hitch arm for engagement by the free end of the resilient half-spring to resist pitching action between the coupled ends of the trailer and the prime mover.

JAMES J. BLACK.